US012690716B1

(12) United States Patent
Khader

(10) Patent No.: US 12,690,716 B1
(45) Date of Patent: Jul. 28, 2026

(54) MULTI-CONFIGURATION HERB GRINDER WITH ENHANCED CRUSHING EFFICIENCY AND INTERCHANGEABLE CONTOURED GRINDING SURFACES

(71) Applicant: Ayman Abu Khader, Portland, OR (US)

(72) Inventor: Ayman Abu Khader, Portland, OR (US)

( * ) Notice: Subject to any disclaimer, the term of this patent is extended or adjusted under 35 U.S.C. 154(b) by 0 days.

(21) Appl. No.: 18/674,875

(22) Filed: May 26, 2024

(51) Int. Cl.
| | |
|---|---|
| *A47J 42/14* | (2006.01) |
| *A47J 42/20* | (2006.01) |
| *A47J 42/30* | (2006.01) |
| *A47J 42/40* | (2006.01) |
| *A47J 42/50* | (2006.01) |

(52) U.S. Cl.
CPC .............. *A47J 42/14* (2013.01); *A47J 42/20* (2013.01); *A47J 42/30* (2013.01); *A47J 42/40* (2013.01); *A47J 42/50* (2013.01)

(58) Field of Classification Search
CPC .. A47J 42/14; A47J 42/20; A47J 42/30; A47J 42/40; A47J 42/50
See application file for complete search history.

(56) References Cited

U.S. PATENT DOCUMENTS

| | | | |
|---|---|---|---|
| 10,779,683 B1 * | 9/2020 | Teller ...................... | B26B 27/00 |
| 2008/0191073 A1 * | 8/2008 | Bao ......................... | B02C 18/24 |
| | | | 241/101.2 |
| 2018/0206675 A1 * | 7/2018 | Mennillo ................ | A47J 42/20 |
| 2020/0260782 A1 * | 8/2020 | Wyporski ............... | A47J 42/24 |
| 2021/0177209 A1 * | 6/2021 | Barrett ................... | A47J 42/36 |

* cited by examiner

*Primary Examiner* — Mohammed S. Alawadi
(74) *Attorney, Agent, or Firm* — Adibi IP Group, PC; Amir V. Adibi; Andrew C. Palmer

(57) ABSTRACT

A grinder comprises an upper grinding housing with an upper contoured grinding surface and a lower grinding housing with a lower contoured grinding surface. The lower contoured grinding surface has multiple openings. The upper and lower contoured grinding surfaces have no teeth or protruding, non-smooth features as in conventional grinders. In operation, ground material falls between the openings and is collected in a lower chamber. The grinder includes an upper collection chamber attached to the lower grinding housing and a lower collection chamber attached to the upper collection chamber. An upper cap is removably attached or integrally fixed to the upper grinding housing. The apparatus is made from any suitable material, including stainless steel, aluminum, titanium, zinc, polymer, stone, wood, or any combination thereof. In some embodiments, a locking mechanism is provided that secures the lower and upper grinding housings thereby preventing disengagement when not in use.

19 Claims, 7 Drawing Sheets

ANOTHER PERSPECTIVE VIEW OF UPPER GRINDING HOUSING

GRINDER
10

UPPER CAP
11

UPPER
GRINDING
HOUSING
12

UPPER
CONTOURED
GRINDING
SURFACE
16

LOWER
CONTOURED
GRINDING
SURFACE
17

LOWER
GRINDING
HOUSING
13

MESH
SCREEN
18

UPPER
COLLECTION
CHAMBER
14

LOWER
COLLECTION
CHAMBER
15

EXPLODED VIEW OF GRINDER

CAP RIDGES
19

UPPER CAP
11

UPPER
GRINDING
HOUSING
12

UPPER
CONTOURED
GRINDING
SURFACE
16

PERSPECTIVE VIEW OF UPPER GRINDING HOUSING

UPPER
GRINDING
HOUSING
12

UPPER
CONTOURED
GRINDING
SURFACE
16

UPPER MAGNET
20

ANOTHER PERSPECTIVE VIEW OF UPPER GRINDING
HOUSING

LOWER
CONTOURED
GRINDING
SURFACE
17

OPENINGS
22

LOWER MAGNET
21

LOWER
GRINDING
HOUSING
13

PERSPECTIVE VIEW OF LOWER GRINDING HOUSING

LOWER
CONTOURED
GRINDING
SURFACE
17

LOWER
GRINDING
HOUSING
13

ANOTHER PERSPECTIVE VIEW OF LOWER GRINDING
HOUSING

BOTTOM-UP VIEW OF UPPER GRINDING SURFACE

TOP-DOWN VIEW OF LOWER GRINDING SURFACE

PERSPECTIVE VIEW OF UPPER COLLECTION CHAMBER

PERSPECTIVE VIEW OF GRINDING HOUSINGS

100

START

101 — FORM AN UPPER HOUSING WITH UPPER CONTOURED GRINDING SURFACE

102 — FORM LOWER HOUSING WITH LOWER CONTOURED GRINDING SURFACE

103 — PACKAGE UPPER HOUSING AND LOWER HOUSING INTO PACKAGED GRINDER

END

FORMING GRINDER

MULTI-CONFIGURATION HERB GRINDER WITH ENHANCED CRUSHING EFFICIENCY AND INTERCHANGEABLE CONTOURED GRINDING SURFACES

TECHNICAL FIELD

The present invention relates generally to grinding devices, and more specifically, to manually operated grinding devices.

BACKGROUND INFORMATION

A grinder device is a grinding tool that cuts material into smaller uniform pieces. Grinder devices are typically used to grind herbs commonly used for cooking. Grinder devices can either be used manually or electronically. Manual grinders provide full control of the cutting process and produce no appreciable heat during operation.

SUMMARY

A grinder comprises an upper grinding housing having an upper contoured grinding surface and a lower grinding housing having a lower contoured grinding surface. The lower contoured grinding surface has a plurality of openings. The grinder includes an upper collection chamber attached to the lower grinding housing opposite the upper grinding housing. The grinder also includes a lower collection chamber attached to the upper collection chamber opposite the lower grinding housing. The grinder includes an upper cap attached or integrally fixed to the upper grinding housing opposite the lower grinding housing. The grinder is made from any suitable material, including stainless steel, aluminum, titanium, zinc, polymer, stone, wood, and any combination thereof. In various embodiments, the grinder includes a lock or connection mechanism to prevent the lower grinding housing from disengaging from the upper grinding housing when not in use.

According to yet another aspect of the present disclosure, a method includes forming a grinding device having an upper grinding housing and a lower grinding housing. The upper grinding housing comprises an upper contoured grinding surface and the lower grinding housing comprises a lower contoured grinding surface. The upper and lower contoured grinding surfaces form a non-planar grinding surface. The method further includes the lower contoured grinding surface having a plurality of openings and the lower contoured grinding surface only includes smooth concave surfaces apart from the plurality of openings. A smooth surface is a curved surface that does not contain any corners or edges. In another embodiment, the lower contoured grinding surface is formed without any openings and ground material is collected in the lower contoured grinding surface during grinding operation.

Further details, embodiments, and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Figure 1:
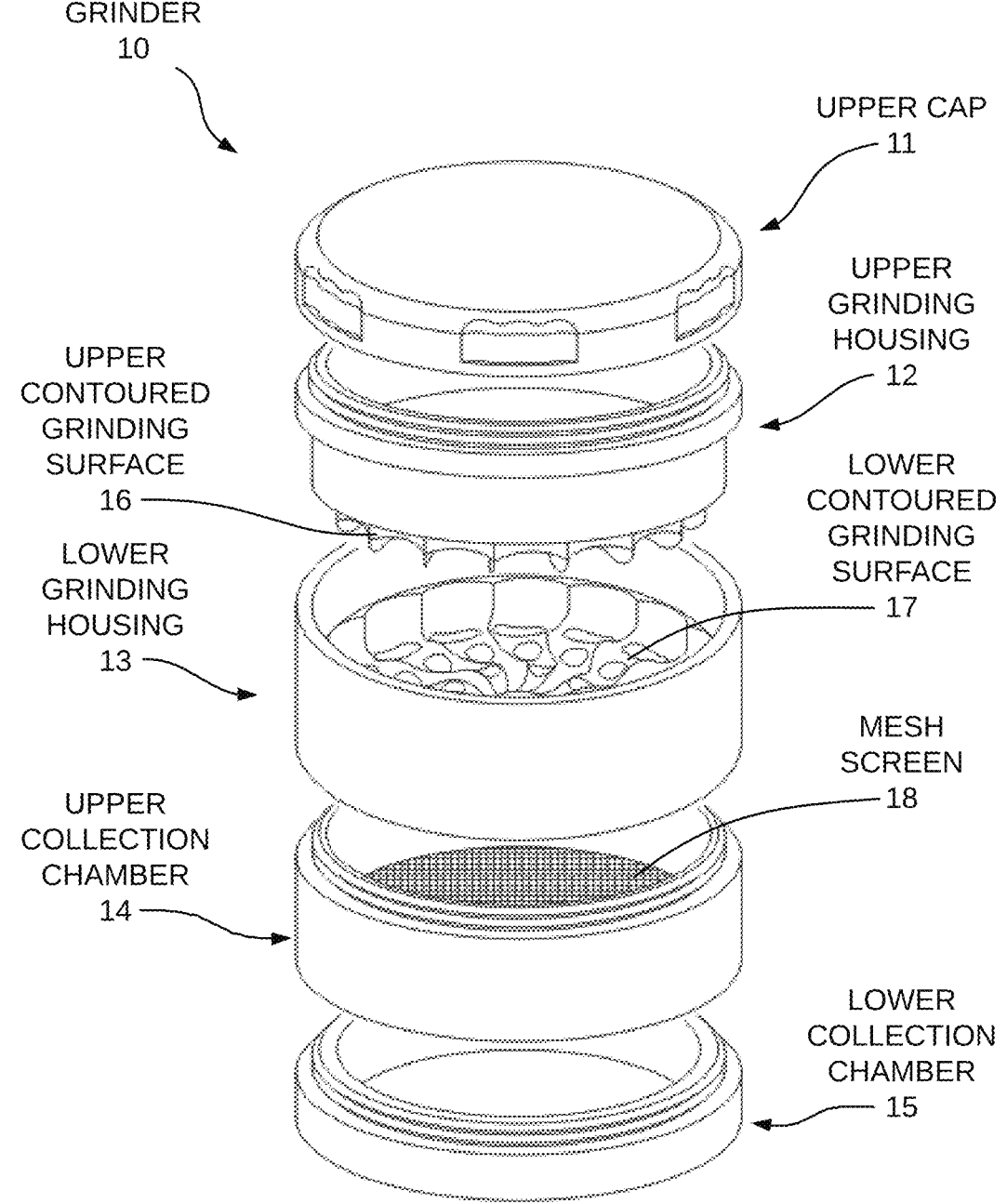
FIG. 1 is an exploded view of a grinder assembly.

Reference will now be made in detail to some embodiments of the invention, examples of which are illustrated in the accompanying drawings.

The following description sets forth exemplary aspects of the present disclosure. It should be recognized, however, that such description is not intended as a limitation on the scope of the present disclosure. Rather, the description also encompasses combinations and modifications to those exemplary aspects described herein.

The present disclosure relates to a grinding apparatus and method, particularly for crushing and grinding materials such as herbs. The apparatus and method involves the use of uniquely contoured grinding surfaces, which enhance the efficiency and precision of the grinding process.

In some aspects, the apparatus includes an upper grinding housing and a lower grinding housing, each having a contoured grinding surface. The lower contoured grinding surface has a plurality of openings. The apparatus also includes an upper collection chamber attached to the lower grinding housing, and a lower collection chamber attached to the upper collection chamber. In some cases, an upper cap is attached to the upper grinding housing. In various embodiments, the apparatus is constructed from a variety of materials, including but not limited to stainless steel, aluminum, titanium, zinc, polymer, stone, wood, or any combination thereof.

In some embodiments, the apparatus includes a connection mechanism to prevent the lower grinding housing from disengaging from the upper grinding housing when not in use. This feature enhances the safety and convenience of the apparatus.

In some cases, the apparatus is a single stage grinder, which includes an upper grinding housing and a lower grinding housing, wherein the lower contoured grinding surface does not contain any openings. Ground material is collected in the lower grinding housing. This configuration is suitable for specific grinding requirements or preferences.

The present disclosure also relates to a method for forming a grinding device. The method involves forming an upper grinding housing and a lower grinding housing, each with a contoured grinding surface. The upper and lower contoured grinding surfaces forms a non-planar grinding surface, which enhances the grinding efficiency. In some aspects, the lower contoured grinding surface has a plurality of openings. In other embodiments, the lower contoured grinding surface has no openings, and ground material is collected in the lower contoured grinding surface during the grinding operation.

The apparatus and method of the present disclosure offers several benefits. For example, the use of contoured grinding surfaces enhances the efficiency and precision of the grinding process. The inclusion of collection chambers facilitates the collection and separation of ground material. The use of high-quality materials enhances the durability of the apparatus and prevents contamination of the ground material. Furthermore, the inclusion of a connection mechanism enhances the safety and convenience of the apparatus.

FIG. 1 is an exploded view of a grinder assembly 10. The grinder assembly 10 includes an upper cap 11, an upper grinding housing 12, a lower grinding housing 13, an upper collection chamber 14, and a lower collection chamber 15. The upper grinding housing 12 includes an upper contoured grinding surface 16. The lower grinding housing 13 includes a lower contoured grinding surface 17. In some aspects, the upper grinding housing 12 and the lower grinding housing 13 are designed to work in conjunction to grind materials between the upper contoured grinding surface 16 and the lower contoured grinding surface 17.

In various embodiments, the grinder assembly 10 includes an upper collection chamber 14 attached to the lower grinding housing 13 opposite the upper grinding housing 12. The upper collection chamber 14 is configured to collect ground material that falls through openings on the lower grinding housing 13. The lower collection chamber 15 is designed to collect finer particles that pass through a mesh screen 18 of the upper collection chamber 14. In other embodiments, the grinder assembly 10 includes no upper collection chamber 14 or mesh screen 18 and employs a single lower chamber, such as a lower collection chamber 15, that is attached to the upper collection chamber 14.

In some embodiments, the grinder assembly 10 includes an upper cap 11 attached to the upper grinding housing 12 opposite the lower grinding housing 13. The upper cap 11 is designed to cover the upper grinding housing 12 when the grinder assembly 10 is not in use. This configuration enhances the safety and convenience of the grinder assembly 10.

Figure 2:
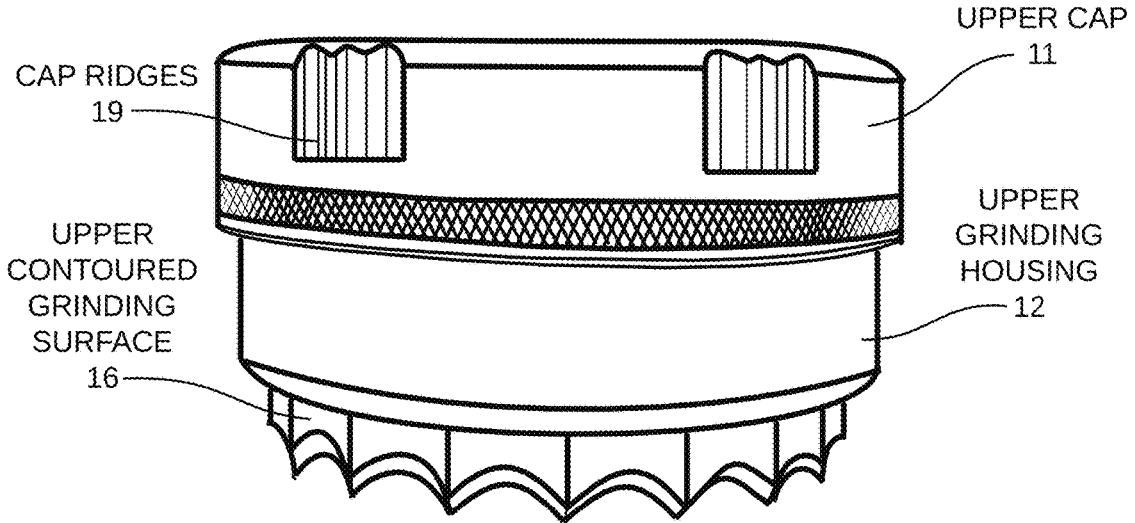
FIG. 2 is a diagram of a perspective view of an upper grinding housing.
Figure 3:
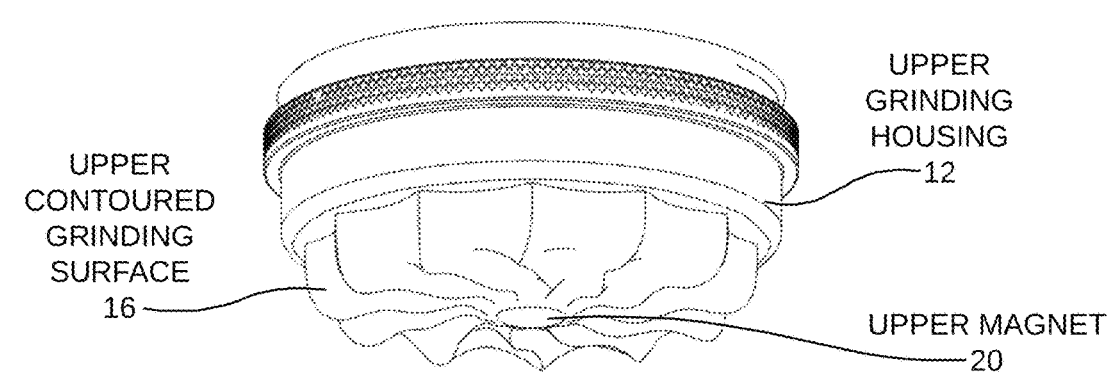
FIG. 3 is a diagram of another perspective view of an upper grinding housing.

FIGS. 2-3 are diagrams of perspective views of the upper portion of a grinder device. FIG. 2 is a diagram of the upper grinding housing 12 with the upper cap 11 positioned above it. In some embodiments, the upper cap 11 features cap ridges 19, which could provide grip or facilitate the attachment and detachment of the cap. In various embodiments, the upper grinding housing 12 encloses the upper contoured grinding surface 16, which is designed to interact with a corresponding lower grinding surface, not shown in these figures, to grind material.

FIG. 3 is a diagram of a perspective view of the same upper grinding housing 12 from a different angle. In this embodiment, an upper magnet 20 is included to provide a connection between the upper grinding housing 12 and the lower grinding housing 13. In some embodiments, the upper magnet 20 is used for magnetic attachment to the lower grinding housing or for securing the upper cap 11 when the device is not in use. The relationship between these elements suggests a design focused on functionality and ease of use, with the upper magnet 20 providing a simple method for keeping the components together. In other embodiments, no magnets are involved in connecting the upper grinding housing 12 and the lower grinding housing 13.

Figure 4:
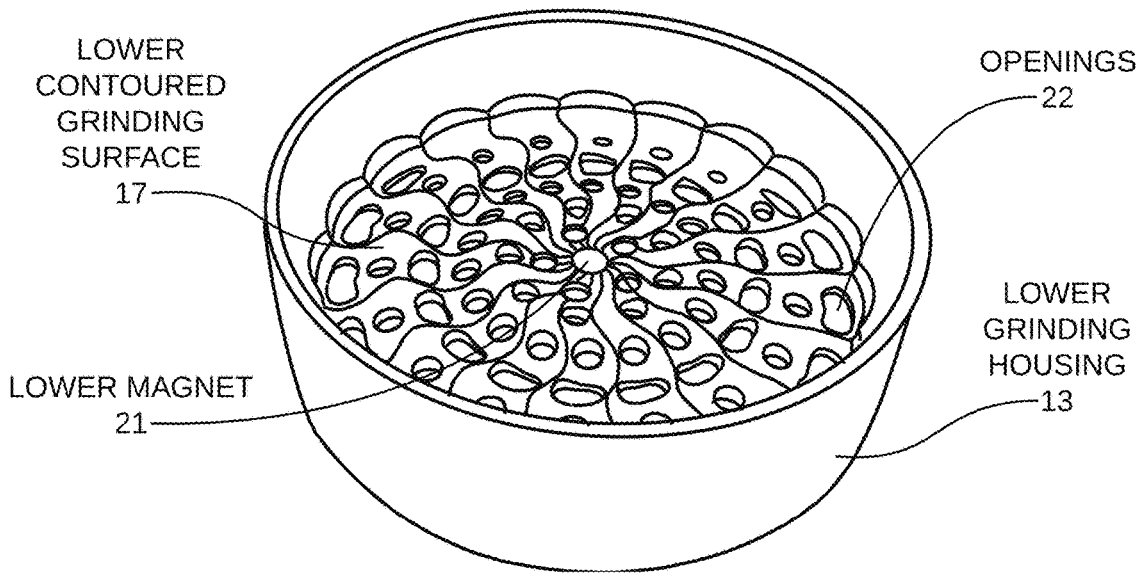
FIG. 4 is a diagram of a perspective view of a lower grinding housing.
Figure 5:
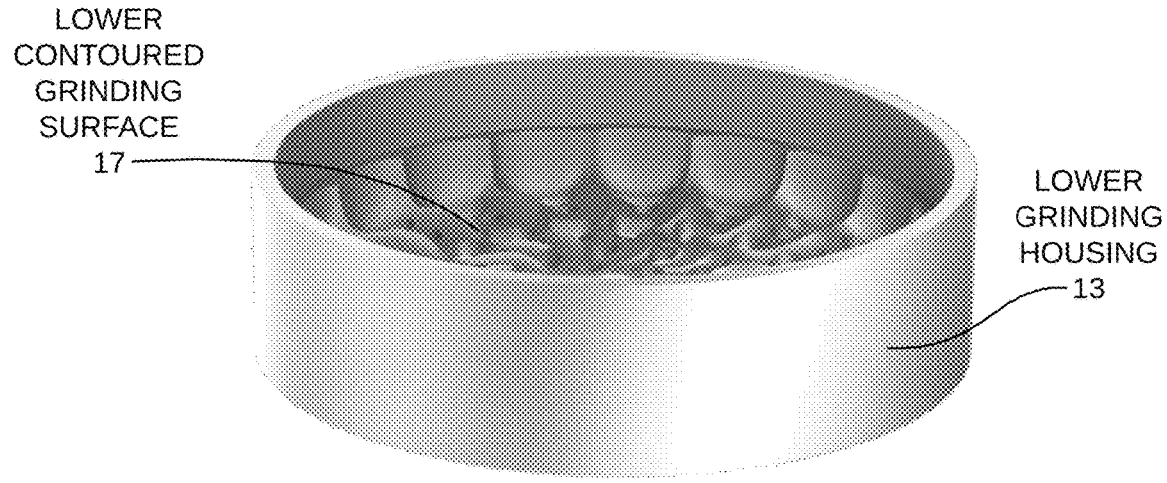
FIG. 5 is a diagram of another perspective view of a lower grinding housing.

FIGS. 4-5 are diagrams showing perspective views of the lower grinding housing 13 of a grinder device. FIG. 4 shows a top perspective view of the lower grinding housing 13, highlighting the interior features. The lower contoured grinding surface 17 is visible with its distinctive pattern designed for grinding. A plurality of openings 22 is distributed across the lower contoured grinding surface 17, allowing for the passage of crushed material. In some embodiments, the lower contoured grinding surface 17 does not contain any openings 22. In other embodiments, the lower contoured grinding surface 17 has a plurality of openings 22. In various embodiments, lower contoured grinding surface 17 only contains smooth concave surfaces apart from the plurality of openings 22. In yet other embodiments, the lower contoured grinding surface 17 has no openings 22 and ground material is collected in the lower contoured grinding surface 17 during the grinding operation.

FIG. 5 is a diagram of an angled side perspective view of the same lower grinding housing 13, providing a view of the exterior and a portion of the interior. In this embodiment a lower magnet 21 is situated centrally, indicating the location where the lower grinding housing 13 can be magnetically attached to a corresponding upper component. The lower grinding housing exterior 13 is shown as a cylindrical wall that encloses the lower contoured grinding surface 17, completing the structure of the lower grinding housing 13.

Figure 6:
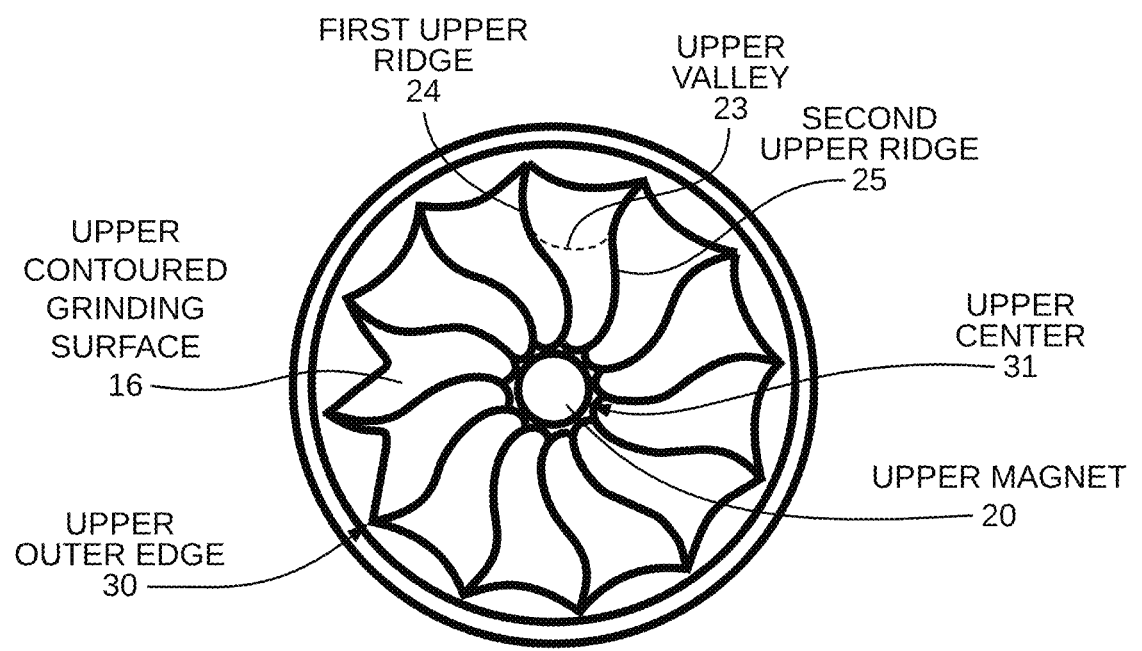
FIG. 6 is a diagram of a bottom-up view of an upper contoured grinding surface.
Figure 7:
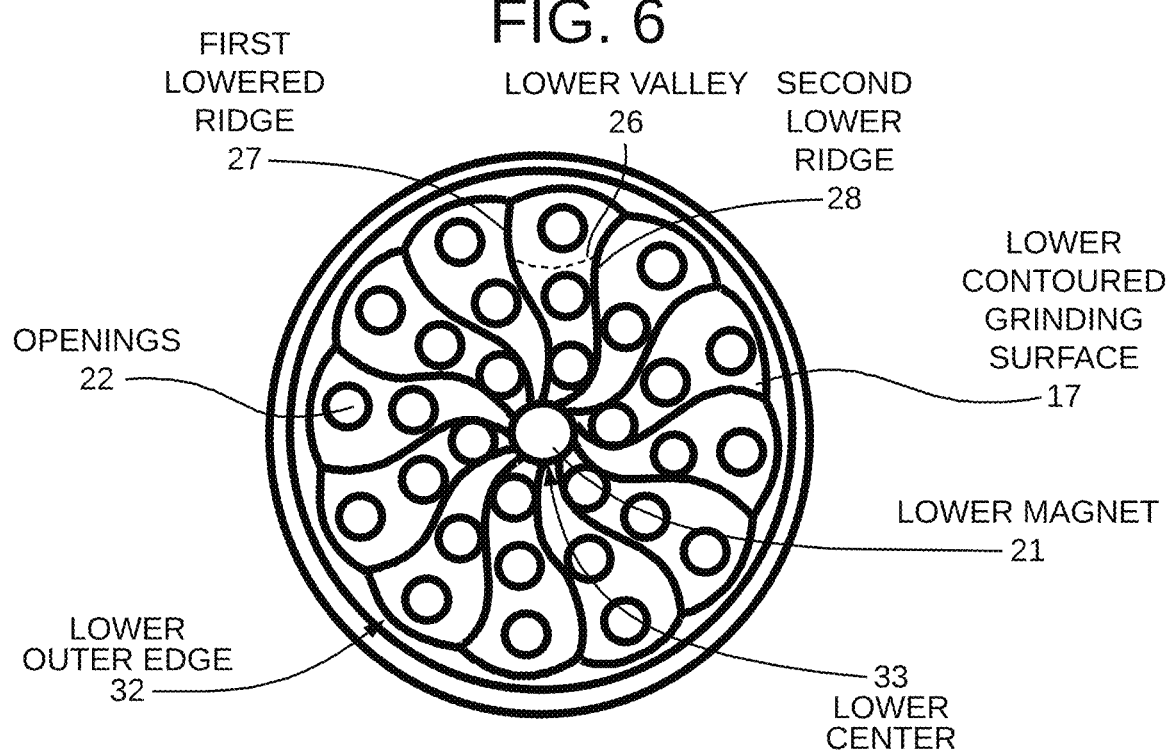
FIG. 7 is a diagram of a top-down view of a lower contoured grinding surface.

FIGS. 6-7 are diagrams showing perspective views of the upper and lower grinding surfaces of a grinder apparatus. FIG. 6 illustrates a bottom-up view of the upper contoured grinding surface 16. FIG. 7 shows a top-down view of the lower contoured grinding surface 17. In some embodiments, the upper contoured grinding surface 16 includes an upper valley 23 that extends between a first upper ridge 24 and a second upper ridge 25. Upper ridges 24 and 25 extend continuously from the upper outer edge 30 of upper contoured grinding surface 16 to the upper center 31 of upper contoured grinding surface 16. An upper magnet 20 is provided centrally at upper center 31 to facilitate attachment between the upper grinding housing 12 and the lower grinding housing 13.

In various embodiments, the lower contoured grinding surface 17 includes a lower valley 26 that extends between a first lower ridge 27 and a second lower ridge 28. Lower ridges 27 and 28 extend continuously from the lower outer edge 32 of lower contoured grinding surface 17 to the lower center 33 of lower contoured grinding surface 17. Upper and lower valleys 23 and 27 are smooth, such that the surface of the valleys are curved and do not contain any corners, flat surfaces that meet at an angle between eighty and one-hundred degrees, or protruding teeth as in conventional grinders. Typical grinders have teeth that extend upwards from a bottom surface and form a ninety-degree angle with the bottom surface. The novel smooth contours of upper and lower contoured grinding surfaces 16 and 17 provide improved grinding surfaces that are easier to collect ground material from and are easier to clean and maintain.

In some embodiments, openings 22 are distributed throughout the lower contoured grinding surface 17. In this embodiment, a lower magnet 21 is centrally located for alignment with the upper magnet 20. In other embodiments, upper and lower contoured grinding surfaces 16 and 17 each consist solely of a set of smooth concave valleys that form ridges where the valleys meet. The arrangement of ridges and valleys on both grinding surfaces is designed to interlock and provide an efficient grinding action during operation.

Figure 8:
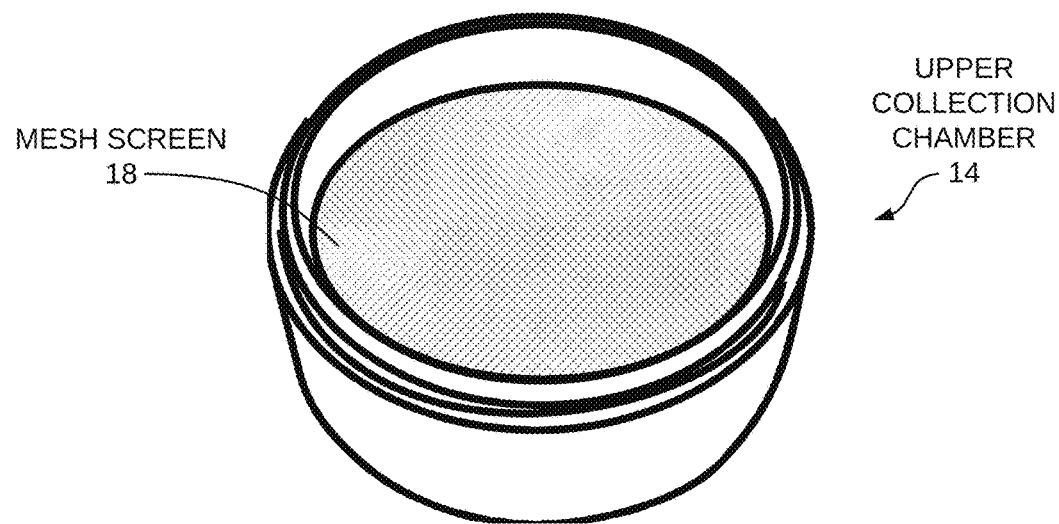
FIG. 8 is a diagram of a perspective view of an upper collection chamber.

FIG. 8 is a diagram showing a perspective view of an upper collection chamber 14. The upper collection chamber 14 is designed to collect and contain the material after it has been processed. Positioned within the upper collection chamber 14 is the mesh screen 18, which serves to separate finer particles from the crushed material. The mesh screen 18 provides passage of particles of a desired size to the lower collection chamber 15 below. The relationship between the mesh screen 18 and the upper collection chamber 14 is such that the mesh screen 18 is seated or integrated within the chamber 14, forming a functional unit for the efficient separation and collection of materials.

In other embodiments, the mesh screen 18 is detachably connected to the upper collection chamber 14, allowing for easy removal and cleaning. In various embodiments, the upper collection chamber 14 is designed with one or more openings in its bottom surface to facilitate the transfer of crushed material to the lower collection chamber 15, optimizing the collection process. In other embodiments, the upper collection chamber 14 does not contain mesh screen 18, and instead has a non-porous bottom surface, in order to collect both crushed material and finer particles.

Figure 9:
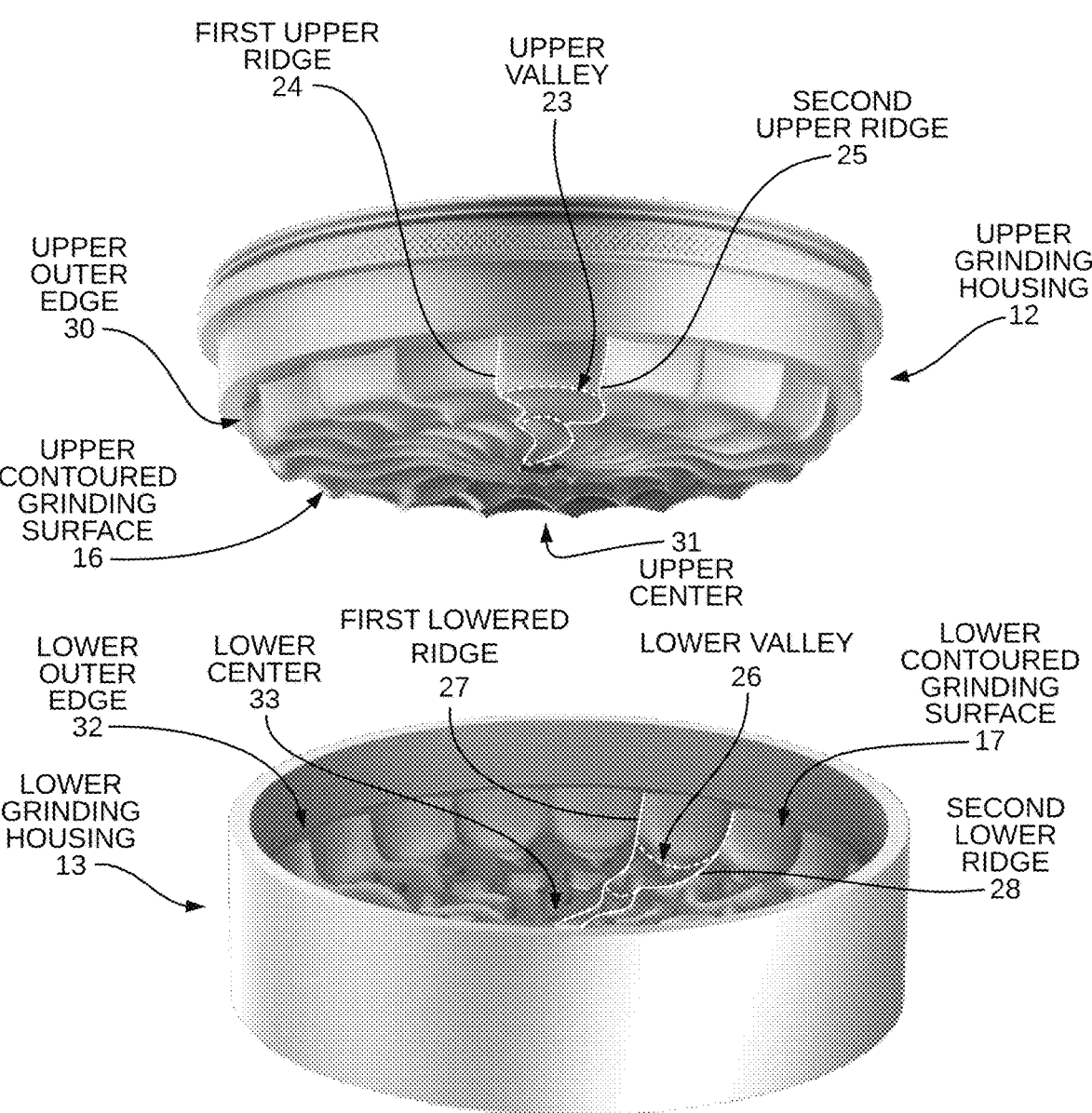
FIG. 9 is a diagram of a perspective view of grinding housings.

FIG. 9 is a diagram of a perspective view of grinding housings showing the upper contoured grinding surface 16 and the lower contoured grinding surface 17. The upper contoured grinding surface 16 includes an upper valley 23 that extends between a first upper ridge 24 and a second upper ridge 25. These features are designed to interlock with the corresponding features on the lower contoured grinding surface 17. The lower contoured grinding surface 17 includes a lower valley 26 that extends between a first lower ridge 27 and a second lower ridge 28. These features align with the ridges and valleys of the upper contoured grinding surface 16 to facilitate the grinding process. The arrangement of these contours and ridges is configured to optimize the crushing and grinding of materials placed between the two surfaces. In some embodiments, the upper and lower contoured grinding surfaces 16 and 17 are detachably connected to the upper and lower grinding housings 12 and 13, allowing for easy removal and cleaning.

Figure 10:
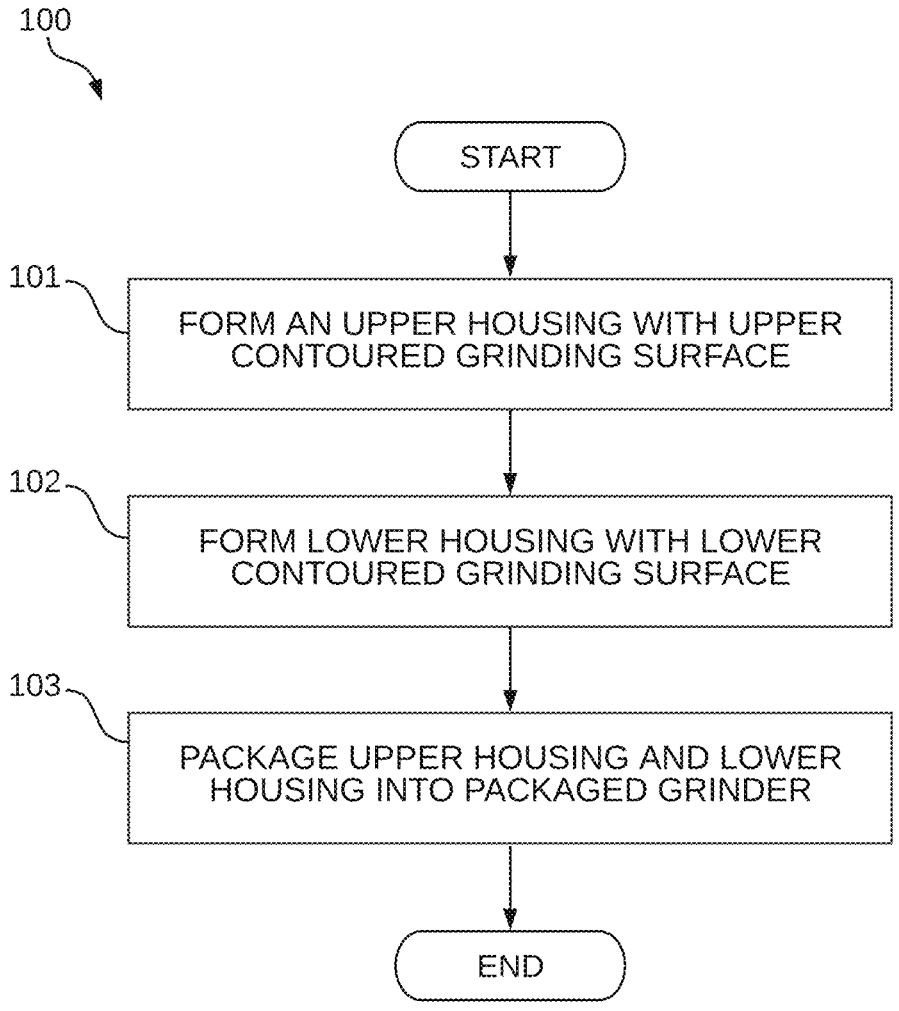
FIG. 10 is a diagram of a method outlining a process for forming a grinder.

FIG. 10 is a flowchart of a method 100 outlining a process for forming a grinder. The process begins with the method 100, which leads to an upper housing formation step 101. In this step, an upper housing with an upper contoured grinding surface 16 is formed. Following this, the process continues to a lower housing formation step 102, where a lower housing with a lower contoured grinding surface 17 is formed. The final step in the flowchart is a packaging step 103, where the upper housing and lower housing are packaged into a finished grinder product. The flowchart 100 clearly illustrates the sequential steps involved in the manufacturing process of the grinder, from the initial formation of the individual housings to the final packaging of the assembled product.

In various embodiments, the method 100 includes forming a grinding device having an upper grinding housing 12 and a lower grinding housing 13. The upper grinding housing 12 comprises an upper contoured grinding surface 16, and the lower grinding housing 13 comprises a lower contoured grinding surface 17. In some aspects, the upper and lower contoured grinding surfaces 16 and 17 form a non-planar grinding surface. This configuration can enhance the grinding efficiency by providing a larger surface area for grinding and can also facilitate the grinding of materials of various sizes and shapes.

Grinder assembly 10 can be configured in various ways to accommodate different grinding requirements or preferences. In some embodiments, the lower contoured grinding surface 17 of the lower grinding housing 13 does not contain any openings 22. This configuration can be suitable for specific grinding requirements or preferences, such as when a finer grind is desired or when the material being ground is of a type that does not easily pass through openings. In other embodiments, the lower contoured grinding surface 17 of the lower grinding housing 13 has a plurality of openings 22. These openings 22 can allow for the passage of crushed material, facilitating the transfer of the ground material to a collection chamber or other receptacle.

In various embodiments, the upper and lower contoured grinding surfaces 16 and 17 only contain smooth concave surfaces other than the plurality of openings 22, if such openings are present. This configuration can enhance the grinding efficiency by providing a larger surface area for grinding, facilitating the grinding of materials of various shapes and sizes, as well as promoting ease of cleaning. In yet other embodiments, the lower contoured grinding surface 17 has no openings 22 and ground material is collected in the lower contoured grinding surface 17 during the grinding operation. This configuration can be particularly useful when the material being ground is of a type that does not easily pass through openings, or when a finer grind is desired.

These various configurations of the grinder assembly 10, including the presence or absence of openings 22 in the lower contoured grinding surface 17, and the presence or absence of non-smooth concave surfaces, provide flexibility and versatility in the use of the grinder assembly 10, allowing it to be adapted to a wide range of grinding requirements and preferences.

In various embodiments, the grinder assembly 10 can be constructed from a variety of materials, including but not limited to stainless steel, aluminum, titanium, zinc, polymer, stone, wood, or any combination thereof. These materials can be selected based on their durability, strength, and potential for contamination of the crushed material. For instance, stainless steel, aluminum, and titanium are known for their strength and durability, making them suitable for heavy-duty grinding applications. On the other hand, polymer, stone, and wood can offer a more aesthetic appeal, while also providing sufficient strength for grinding applications. In some cases, the grinder assembly 10 can be made from a combination of these materials, offering a balance of strength, durability, and aesthetic appeal.

In other embodiments, at least part of the grinder assembly 10 is constructed from environmentally sustainable or recycled materials. This design choice does not compromise the functionality or durability of the grinder assembly 10, but emphasizes the eco-friendly approach of the present disclosure. The use of environmentally sustainable or recycled materials can appeal to environmentally conscious consumers, and can also contribute to the reduction of environmental impact associated with the production of the grinder assembly 10.

In some embodiments, the upper contoured grinding surface 16 and the lower contoured grinding surface 17 are rotationally symmetrical. This design can achieve a uniform crushing action that preserves the natural structure and potency of herbs. The rotational symmetry of the grinding surfaces can also facilitate the grinding process, as the upper and lower grinding surfaces 16 and 17 can rotate relative to each other to crush the material placed between them.

In other embodiments, the grinder assembly 10 includes a connection mechanism to prevent the lower grinding housing 13 from disengaging from the upper grinding housing 12 when not in use. This feature can enhance the safety and convenience of the grinder assembly 10, as it can prevent accidental disassembly of the grinder assembly 10 during storage or transportation. The connection mechanism can be of various types, including but not limited to a magnetic connection, a threaded interface, an interference fit, a locking flange, or any combination thereof. In some cases, the connection mechanism is magnetic, providing a simple and effective means for keeping the components of the grinder assembly 10 together.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. An apparatus comprising:
an upper grinding housing having an upper contoured grinding surface, wherein the upper contoured grinding surface does not contain any teeth, wherein the upper contoured grinding surface extends between an outer edge and a center of the upper contoured grinding surface and consists solely of smooth concave upper valleys that form upper ridges where adjacent upper valleys meet, wherein each of the upper ridges extends non-linearly from the outer edge toward the center from a top-down perspective, and wherein the upper contoured grinding surface does not include any flat or planar surfaces between the outer edge and the center;
an upper magnet disposed at the center of the upper contoured grinding surface;
a lower grinding housing having a lower contoured grinding surface, wherein the lower contoured grinding surface does not contain any teeth, wherein the lower contoured grinding surface extends between an outer edge and a center of the lower contoured grinding surface and consists solely of smooth concave lower valleys that form lower ridges where adjacent lower valleys meet, wherein each of the lower ridges extends non-linearly from the outer edge toward the center from a top-down perspective, wherein the lower contoured grinding surface does not include any flat or planar surfaces between the outer edge and the center, and wherein the lower contoured grinding surface has a plurality of openings disposed within the lower valleys; and
a lower magnet disposed at the center of the lower contoured grinding surface and configured to magnetically couple with the upper magnet, and wherein the upper contoured grinding surface and the lower contoured grinding surface mate thereby forming a non-planar grinding surface.

2. The apparatus of claim 1, wherein the upper contoured grinding surface has no openings.

3. The apparatus of claim 1, wherein the lower contoured grinding surface does not contain any teeth, corners, or surfaces that meet at an angle between eighty and one-hundred degrees.

4. The apparatus of claim 1, wherein the lower contoured grinding surface does not contain any non-smooth concavities apart from edges of the openings.

5. The apparatus of claim 1, further comprising:
an upper collection chamber attached to the lower grinding housing opposite the upper grinding housing.

6. The apparatus of claim 5, wherein the upper collection chamber is attached to the lower grinding housing with a connection mechanism selected from the group consisting of a threaded interface, an interference fit, a magnetic connection, a locking flange, and any combination thereof.

7. The apparatus of claim 5, further comprising:
a lower collection chamber attached to the upper collection chamber opposite the lower grinding housing.

8. The apparatus of claim 7, further comprising:
a mesh screen disposed between the upper collection chamber and the lower collection chamber.

9. The apparatus of claim 7, wherein the upper collection chamber further comprises:
one or more openings in the bottom surface of the upper collection chamber.

10. The apparatus of claim 7, wherein the lower collection chamber is attached to the upper collection chamber with a connection mechanism selected from the group consisting of a threaded interface, an interference fit, a magnetic connection, a locking flange, and any combination thereof.

11. The apparatus of claim 1, further comprising:
an upper cap attached to the upper grinding housing opposite the lower grinding housing.

12. The apparatus of claim 11, wherein the upper cap is attached to the upper grinding housing with a connection mechanism selected from the group consisting of a threaded interface, an interference fit, a magnetic connection, a locking flange, and any combination thereof.

13. The apparatus of claim 11, wherein the upper cap is permanently fixed to the upper grinding housing and not removable.

14. The apparatus of claim 1, wherein the upper grinding housing is attached to the lower grinding housing with a magnetic connection when not in use.

15. The apparatus of claim 1, wherein the apparatus is made from a material selected from the group consisting of stainless steel, aluminum, titanium, zinc, polymer, stone, wood, and any combination thereof.

16. The apparatus of claim 1, wherein at least part of the apparatus is made from environmentally sustainable or recycled materials.

17. The apparatus of claim 1, wherein each of the upper contoured grinding surface and the lower contoured grinding surface is rotationally symmetrical.

18. An apparatus comprising:
an upper grinding housing having an upper contoured grinding surface, wherein the upper contoured grinding surface does not contain any teeth, wherein the upper contoured grinding surface extends between an outer edge and a center of the upper contoured grinding surface and consists solely of smooth concave upper valleys that form upper ridges where adjacent upper valleys meet, wherein each of the upper ridges extends non-linearly from the outer edge toward the center as viewed in a top-down view, and wherein the upper contoured grinding surface does not include any flat or planar surfaces between the outer edge and the center; and
a lower grinding housing having a lower contoured grinding surface, wherein the lower contoured grinding surface does not contain any teeth, wherein the lower contoured grinding surface extends between an outer edge and a center of the lower contoured grinding surface and consists solely of smooth concave lower valleys that form lower ridges where adjacent lower valleys meet, wherein each of the lower ridges extends non-linearly from the outer edge toward the center as viewed in a top-down view, wherein the lower contoured grinding surface does not include any flat or planar surfaces between the outer edge and the center, wherein the lower contoured grinding surface has a plurality of openings disposed within the lower valleys, wherein the upper contoured grinding surface and the lower contoured grinding surface mate thereby forming a non-planar grinding surface, wherein the upper contoured grinding surface and the lower contoured grinding surface are rotationally symmetrical, and wherein the upper ridges and lower ridges are equal in number.

19. An apparatus comprising:

an upper grinding housing having an upper contoured grinding surface, wherein the upper contoured grinding surface does not contain any teeth, wherein the upper contoured grinding surface extends between an outer edge and a center of the upper contoured grinding surface and consists solely of smooth concave upper valleys that form upper ridges where adjacent upper valleys meet, wherein each of the upper ridges extends non-linearly from the outer edge toward the center as viewed in a top-down view, and wherein the upper contoured grinding surface does not include any flat or planar surfaces between the outer edge and the center;

a lower grinding housing having a lower contoured grinding surface, wherein the lower contoured grinding surface does not contain any teeth, wherein the lower contoured grinding surface extends between an outer edge and a center of the lower contoured grinding surface and consists solely of smooth concave lower valleys that form lower ridges where adjacent lower valleys meet, wherein each of the lower ridges extends non-linearly from the outer edge toward the center as viewed in a top-down view, wherein the lower contoured grinding surface does not include any flat or planar surfaces between the outer edge and the center, wherein the lower contoured grinding surface has a plurality of openings disposed within the lower valleys, wherein the upper contoured grinding surface and the lower contoured grinding surface mate thereby forming a non-planar grinding surface;

an upper collection chamber attachable to the lower grinding housing, wherein the upper collection chamber includes a mesh screen; and a lower collection chamber attachable to the upper collection chamber, wherein the mesh screen provides passage of particles smaller than a predetermined size from the upper collection chamber to the lower collection chamber.

\* \* \* \* \*